(12) United States Patent
Clemens et al.

(10) Patent No.: US 11,840,105 B2
(45) Date of Patent: Dec. 12, 2023

(54) DEVICE AND METHOD FOR PRINTING ON ONE OR BOTH SIDES OF A PLURALITY OF FLAT OBJECTS

(71) Applicant: Muehlbauer GmbH & Co. KG, Roding (DE)

(72) Inventors: Helge Clemens, Roding (DE); Rene Heidner, Plauen (DE)

(73) Assignee: MUEHLBAUER GMBH & CO. KG, Roding (DE)

( * ) Notice: Subject to any disclaimer, the term of this patent is extended or adjusted under 35 U.S.C. 154(b) by 11 days.

(21) Appl. No.: 17/651,264

(22) Filed: Feb. 16, 2022

(65) Prior Publication Data
US 2022/0266607 A1  Aug. 25, 2022

(30) Foreign Application Priority Data
Feb. 25, 2021  (DE) .......................... 102021104490.1

(51) Int. Cl.
*B41J 3/60* (2006.01)
*B41J 11/00* (2006.01)

(52) U.S. Cl.
CPC ............... *B41J 3/60* (2013.01); *B41J 11/007* (2013.01)

(58) Field of Classification Search
CPC ... B41J 3/60; B41J 11/007; B41J 13/12; B41J 2/01; B41J 3/00; B41J 11/00214; B65H 3/30; B65H 5/006; B65H 2701/1914; B65H 15/00; B65H 15/02; B65H 31/3063; B65H 85/00; B65H 3/042; B65H 5/021; B65H 5/36; B65H 31/02; B65H 31/30; B65H 2701/1131; G06K 13/077; G06K 13/103; G06K 17/00
See application file for complete search history.

(56) References Cited

U.S. PATENT DOCUMENTS

| | | | |
|---|---|---|---|
| 4,825,054 A | 4/1989 | Rust et al. | |
| 5,266,781 A | 11/1993 | Warwick et al. | |
| 5,943,238 A | 8/1999 | Nioche et al. | |
| 6,105,493 A | 8/2000 | Skubic et al. | |

(Continued)

FOREIGN PATENT DOCUMENTS

| | | |
|---|---|---|
| DE | 19756796 A1 | 7/1999 |
| DE | 202016008603 U1 | 8/2018 |
| EP | 3130646 B1 | 8/2018 |

*Primary Examiner* — Justin Seo
*Assistant Examiner* — Tracey M McMillion
(74) *Attorney, Agent, or Firm* — John A. Miller; Shumaker, Loop & Kendrick LLP

(57) ABSTRACT

An apparatus for printing on one or both sides of flat objects. The apparatus includes a loop-shaped conveying path for the flat objects; a feed conveyor configured to feed the objects to be printed into a first section of the conveying path; a printer configured to print the objects one at a time; a first discharge conveyor configured to discharge the objects to be printed one at a time downstream of the printer from the first section towards a second section; a first collector configured to collect the objects downstream of the first discharge conveyor at the second section discharged from the first discharge conveyor in a stack; a stack conveyor configured to convey a (partial) stack of the objects along the second section; and a second collector configured to receive at least one (partial) stack and feed the objects upstream to the printer into the first section.

13 Claims, 2 Drawing Sheets

(56) References Cited

U.S. PATENT DOCUMENTS

| | | | |
|---|---|---|---|
| 6,695,205 | B1 | 2/2004 | Lundstrom et al. |
| 6,783,067 | B2 | 8/2004 | Kreuter et al. |
| 6,902,107 | B2 | 6/2005 | Shay et al. |
| 7,398,972 | B2 | 7/2008 | Schuller et al. |
| 7,434,728 | B2 | 10/2008 | Paulson et al. |
| 2013/0220984 | A1 | 8/2013 | Cronin et al. |
| 2014/0063086 | A1* | 3/2014 | Morgavi ............ B41J 11/00214 347/5 |
| 2019/0197388 | A1* | 6/2019 | Beech .................. G06K 13/077 |

* cited by examiner

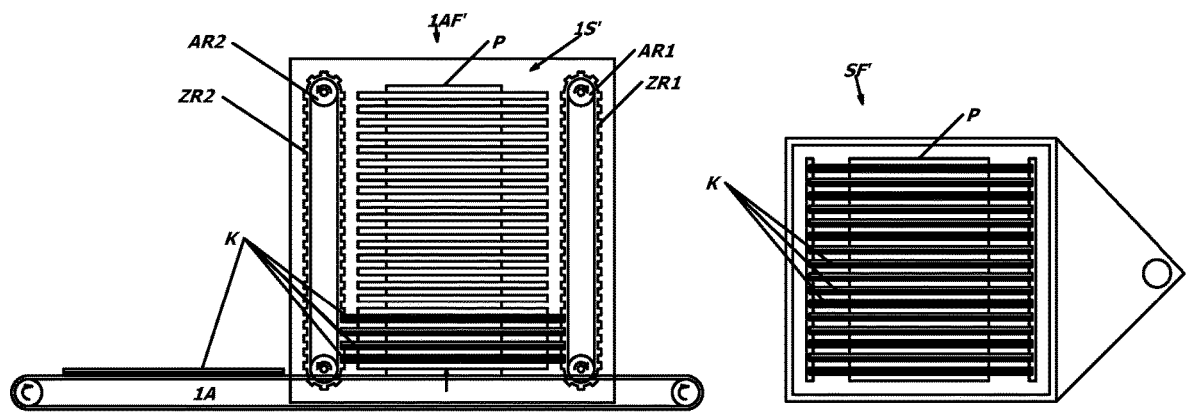
Fig. 2a
Fig. 2b
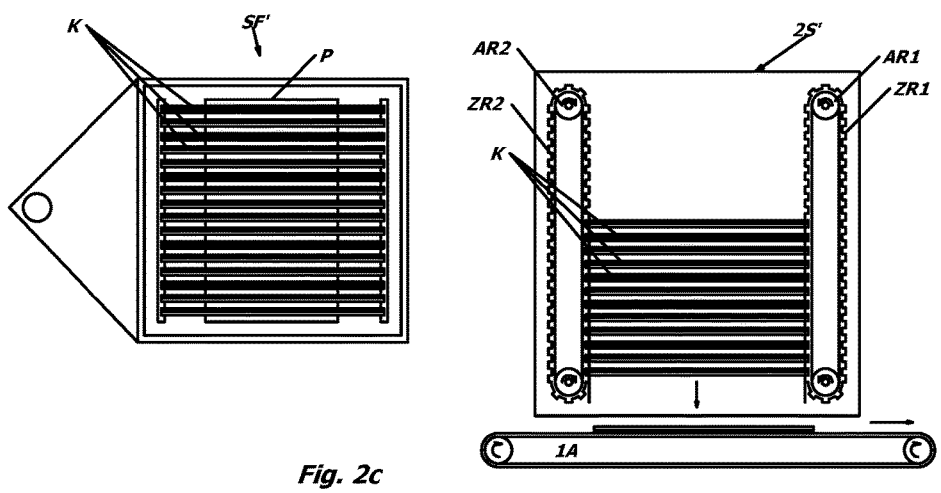
Fig. 2c
Fig. 2d

DEVICE AND METHOD FOR PRINTING ON ONE OR BOTH SIDES OF A PLURALITY OF FLAT OBJECTS

CROSS-REFERENCE TO RELATED APPLICATIONS

This application claims priority to German Patent Application Serial No. 10 2021 104 490.1 filed Feb. 25, 2021, the entire disclosure of which is herein incorporated by reference.

BACKGROUND

Field

Disclosed herein is an apparatus and method for printing on one or both sides of flat objects. Aspects of the apparatus and method are defined in the description, as well as in the figures and claims. Flat objects are understood to be, in particular, paper or plastic cards to be personalized or otherwise processed, in particular for identification purposes, such as financial cards, for example credit and bank cards, identification cards, driver's licenses, gift cards, etc.

Discussion of the Related Art

Printing, especially personalization of such flat objects, especially cards is usually done on both sides (front and back). However, cards with printing on one side are also often required. Labeling systems such as a drop on demand (DOD) inkjet printer with a single-pass printing process are known, for example, from EP 3 130 646 B1. Such a single-pass printer has several print heads in the direction of conveyance of the flat objects to be printed. Each print head, connected to an ink reservoir, has a plurality of print nozzles to print a particular color (cyan, magenta, white, black, etc.). Each print head extends across the entire width of the flat objects transverse to the direction of conveyance. In such printing systems, the flat objects cannot be stopped and turned under the print heads due to the lack of correspondingly elaborate and complex mechanics and controls. The costs for the printing system components (printer, ink drying station, etc.) are high. For small and medium production volumes, double/multiple print paths are not economical. For two such marking systems arranged one behind the other for the front and back of such flat objects, a construction length/footprint of the production plant is required which is not always available. Furthermore, the costs for this are not always economically justifiable.

DE 2020 16008603 U1 relates to a card processing system comprising a card processing path, a card printing mechanism disposed along the card processing path, the card printing mechanism comprising a primary card movement path along which cards can move in a downstream direction, a printing station on the primary card movement path, a printing station on the primary card movement path performing a printing operation on a surface of a card on the primary card movement path, a card return movement path along each of which a card that has been passed through the printing station can be deflected from the primary card movement path and returned to the primary card movement path at a location upstream of the printing station to be passed again through the printing station.

The approach described there of feeding each card to the print station along the primary card movement path, and then returning each card to be printed on both sides individually to the front of the print station via the card return movement path, has some disadvantages.

In the above prior art, the length of the card return path in relation to the speed of the cards to be printed on both sides along the card return path and their number on the return path (for cards to be printed on one and two sides) affects the order of the cards at the output of the printing station. In addition, the dwell time of the individual card in each of the plurality of stations along the primary card movement path affects the printing process, making the order of the cards at the output of the printing station more difficult to determine.

Another disadvantage exists when transporting individual cards. Especially if several personalization processes (e.g. electronic coding/personalization of integrated circuits or optical personalization by laser marking) are combined in the production line. Usually, these processes have quite individual and mostly different, application-dependent process times. The resulting different cycle times from the individual processes are difficult to compensate for in the case of continuous single-card transport without card buffer function and cannot be harmoniously adapted for efficient production.

For further technological background, see U.S. Pat. Nos. 7,434,728, 7,398,972, 4,825,054, 5,266,781, 6,783,067, 6,902,107, 6,695,205, 5,943,238, 6,105,493, and US 2013/0220984.

SUMMARY

To avoid such disadvantages, a device and a method for printing on one or both sides of flat objects are disclosed here. The solution presented is particularly advantageous for small and medium batch volumes (1000-0.3000).

Items of the type addressed here include security or identification documents such as passports, ID cards, driver's licenses, identification cards, credit cards, bank cards, cash cards, labels, access passes, and the like.

Items of the type presented here that are used as security or identification documents are usually produced centrally in their raw form, i.e., without personalization data, and then personalized decentrally, for example at registration offices, at public authorities or in companies authorized to issue such documents. During personalization, personalization data individually identifying the respective holder of the security or identification document is incorporated into the security or identification document in the form of text, numerical and/or image data (for example, the holder's name and address, date of birth, place of birth, photograph of the holder, biometric data of the holder, etc.), as well as the date of issue and period of validity of the document. This text, numerical and/or image data is at least partially directly readable by an observer. At least for the application of the personalization data to the objects, but also for their raw design, the solution presented here is intended and can be used.

An apparatus presented herein for printing on one or both sides of flat objects comprises a loop-shaped conveying path for the flat objects, the conveying path being arranged to convey along a first section of the conveying path the objects individually, and along a second section of the conveying path (partial) stacks comprising a plurality of objects; an input conveyor adapted to individually input the objects to be printed into the first portion of the conveyor path upstream of a printer; a printer disposed along the first portion of the conveyor path and adapted to print on a side facing the printer on the objects individually fed to the printer by the first portion; a first discharge conveyor arranged and controlled to discharge the objects to be printed on both sides one by one downstream of the printer from the first section toward the second section; a first collector for the objects, the first collector being arranged downstream of the first discharge conveyor at the second section and arranged to collect objects discharged from the first discharge conveyor in a stack; a stack conveyor for a (partial) stack of the objects from the first collector, the stack conveyor being arranged and adapted to convey the (partial) stack of the objects along the second section; a second collector arranged at the second section, the second collector being adapted to receive at least one (partial) stack conveyed by the stack conveyor along the second section and to feed the objects thereof individually upstream to the printer into the first section.

In one variant of the proposed solution, a second discharge conveyor is provided, which is arranged to discharge the objects individually from the loop-shaped conveyor path downstream of the printer.

The proposed solution is particularly suitable for small and medium production volumes. The items to be labeled are first collected into stacks of the items and then transported in batches to be individually printed and personalized again. A larger production order can also be logically and physically divided into partial stacks. By means of this stack formation, the first side of the item within such a stack is personalized first. Such a stack or partial stack, comprising at least two or more documents, is then fed to the printing section again as a whole in order to personalize the other side of the item.

In one variant of the apparatus, the first collector is arranged to discharge one (partial) stack at a time for pick-up by the stack conveyor as soon as a height of the first stack or the (partial) stack to be defined is reached, such (partial) stack being at least two or more of the sheet-like objects in height.

The first section of the conveyor path comprises, in one variation of the apparatus, a circulating or belt conveyor. In one variant of the device, the second section of the conveyor path comprises an arm or gantry robot, or a rail conveyor.

In one variant of the device, the stack conveyor is set up and arranged to turn the (partial) stack of items between the first and the second collector in such a way that in each case the unprinted side of the item conveyed to the printer faces the printer for printing after leaving the second conveyor.

In one variant of the device, the second collector is set up and arranged to discharge the individual items of the (partial) stack and to turn them over in the process, so that in each case the unprinted side of the item fed to the printer faces the printer for printing after leaving the second collector.

Alternatively, on the upstream side of the printer, before stations for pre-processing the items on the first section, there is a turning station for turning individual items by 180 degrees. This means that items coming from the second collector do not have to be turned either by the pile conveyor or by the second collector. This allows a simpler design of the stack conveyor and/or the second collector.

In one variant of the apparatus, the first section of the conveying path is arranged to continuously transport the objects at a number of pieces per unit time that is at least twice as large as a number of pieces per unit time at which the entry conveyor continuously or intermittently conveys the objects. In a variant of the apparatus, a buffer store is disposed between the entry conveyor and the first portion of the conveying path and is arranged to enter objects entered into the first portion of the conveying path by the entry conveyor as a contiguous group of a plurality of objects, with successive groups being spaced apart. In one variant of the apparatus, the objects are entered as individually spaced apart objects. In this case, the objects may be entered into the first section in an inverted manner.

In one variation of the apparatus, the first section of the conveying path is arranged to feed the objects upstream to the printer, to a cleaning and/or to an input inspection, and/or downstream to the printer, to a drying and/or to an output inspection.

In one variant of the apparatus, the stack conveyor comprises a gripper that is configured and arranged to grip and remove the (partial) stack of objects in the first collector, and to deposit and release them in the second collector. In one variant, the first collector and the second collector have an enclosure that is only partially closed and has an open shell surface. In particular, one side wall is largely open. This allows the gripper to remove the (partial) stack of items from the first collector and deposit the (partial) stack of items into the second collector.

In one variant of the device, the first and/or the second collector comprises spacers that may be adjustable in their spacing in order to form partial stacks of predefined height/number of objects spaced from one another in the height direction. This offers the advantage that a collection of objects discharged by the first discharge conveyor in the first collector and a delivery of a (partial) stack to the stack conveyor can overlap in time. Analogously, this applies to the discharge of individual items of the (partial) stack and a pick-up of the (partial) stack conveyed by the stack conveyor by the second collector.

Along the conveying path, in one variant of the device, a read/write device is arranged and set up to write information into a magnetic strip arranged on the object, into an IC (integrated circuit) embedded in the object. In one variant of the device, the read/write device is set up to perform the writing of the information for each object individually or as a collective entry.

Along the conveyor path, in one variation of the apparatus, a device for laminating, die-cutting, and/or embossing each item is provided upstream or downstream of the printer.

In one variant of the apparatus, the printer is a single-pass inkjet printer having a plurality of print heads arranged in series in the direction of conveyance of the objects to be printed, in particular for ultraviolet (UV) curable ink, and comprising one or more reservoirs each containing an ultraviolet (UV) curable ink of different color. In other variations, the printer is a multi-pass printer.

In one variant, the first collector has a plunger that is arranged and set up to discharge an intended number of the objects from the first collector to the stack conveyor. In one variant, the stack conveyor is designed as a container, in the side walls of which recesses are provided for receiving the objects which a pusher located in the first collector pushes in.

In one variant, a second collector is arranged to receive a (partial) stack removed from the first collector by the stack conveyor along the second section of the conveying path and conveyed to the second collector. In one variant, the second collector and the stack conveyor are arranged to position themselves relative to each other such that the objects are to be pushed out as a complete stack by means of a pusher arranged in the stack conveyor and pushed in between two toothed belts of the second collector. In one variant, the second collector is set up to move its two toothed belts by one tooth pitch by means of their driven rollers in order to discharge an object onto the first section of the conveyor path from a lowermost position of the two toothed belts of the second collector.

A method disclosed here is used for printing on one or both sides of flat objects, in particular with a device having the features shown above, where on a loop-shaped conveyor path the objects are conveyed individually on a first section of the conveyor path and on a second section of the conveyor path as a (partial) stack of objects by an infeed conveyor. The objects to be printed are fed individually into the first section of the conveying path on the upstream side to a printer by having the printer arranged along the first section of the conveying path. The objects fed individually to the conveying path are printed on a side facing the printer by a first discharge conveyor. The objects to be printed on both sides are discharged individually, downstream of the printer, from the first section of the conveyor path in the direction of the second section by a first collecting conveyor arranged downstream of the first discharge conveyor at the second section of the conveyor path. The objects discharged from the first discharge conveyor are collected in a stack by a stacking conveyor. A (partial) stack of the objects from the first collector are conveyed along the second section of the conveying path by a second collector arranged at the second section of the conveying path. At least one (partial) stack conveyed by the stack conveyor along the second section of the conveying path is picked up, and the objects thereof are individually fed into the first section of the conveying path upstream of the printer.

In one variant of the process, a second discharge conveyor is used to discharge the items individually from the loop-shaped conveyor path downstream of the printer.

As soon as, in one variant of the process, a height of the first stack or the (partial) stack to be defined is reached, the (partial) stack is removed from the first collector by means of the stack conveyor and conveyed along the second section of the conveying path to a second collector arranged at the second section of the conveying path and deposited therein.

As soon as, in a further variant of the method, a height to be defined of the first stack or of the (partial) stack is reached, which at least partially comprises the first stack and is at least two or more of the flat objects high, the (partial) stack is entered as a whole onto the second stack in the second collector at the end of the second section of the loop-shaped conveyor path.

In a further variant of the method, while the (partial) stack passes the second section of the loop-shaped conveyor path, the (partial) stack is caused to turn.

In another variant of the process, the items for printing their second side are discharged from the second collector section, entered into the first section, fed to the printer, and finally discharged from the loop-shaped conveyor path at the end of the first section.

In a further variant of the process, the second collector delivers the individual items of the (partial) stack and turns them over in the process, so that in each case the unprinted side of the item fed to the printer faces the printer for printing after leaving the second collector.

In another variation of the method, the first section of the conveyor path continuously transports the objects at a number of pieces per unit time that is at least twice as great as a number of pieces per unit time at which the entry conveyor continuously or intermittently conveys the objects.

In a further variant of the method, between the entry conveyor and the first section of the conveying path, a buffer store carries objects entered into the first section of the conveying path by the entry conveyor as a contiguous group of a plurality of objects, with successive groups being spaced apart. In another variation of the method, the buffer store carries the objects as individually spaced objects. In both variants, the items are entered into the first section turned or un-turned depending on the requirement/design of the buffer store.

Alternatively or additionally, the first section of the conveyor path feeds the items upstream to the printer, a cleaning and/or an input inspection, and/or downstream to the printer, a drying and/or an output inspection.

In another variant of the method, a gripper of the stacking conveyor grips the (partial) stack of items in the first collector and removes the (partial) stack of items from it. At the end of the second section, the gripper also deposits the (partial) stack of items in the second collector and releases the (partial) stack.

In a further variant of the method, a read/write device along the conveying path writes information into a magnetic strip arranged on the object, into an IC (integrated circuit) embedded in the object, while along the conveying path the (partial) stack of objects or the objects are conveyed individually, the read/write device carrying out the writing of the information for each object individually or as a collective entry.

BRIEF DESCRIPTION OF THE DRAWINGS

Further objectives, features, advantages and possible applications result from the following description of non-restrictive examples of variants and the associated drawings. In this context, all the features described and/or illustrated constitute the object disclosed here, either individually or in any combination, also irrespective of their grouping in the claims or their back-relationships. Possible variations will also become clear to a person skilled in the art on the basis of the following description, in which reference is made to the enclosed drawing. Thereby, the Figs. schematically show the device discussed herein.

FIGS. 2a-2d illustrate variants of the first and second collectors and the stack conveyor.

DETAILED DESCRIPTION OF THE EMBODIMENTS

Figure 1:
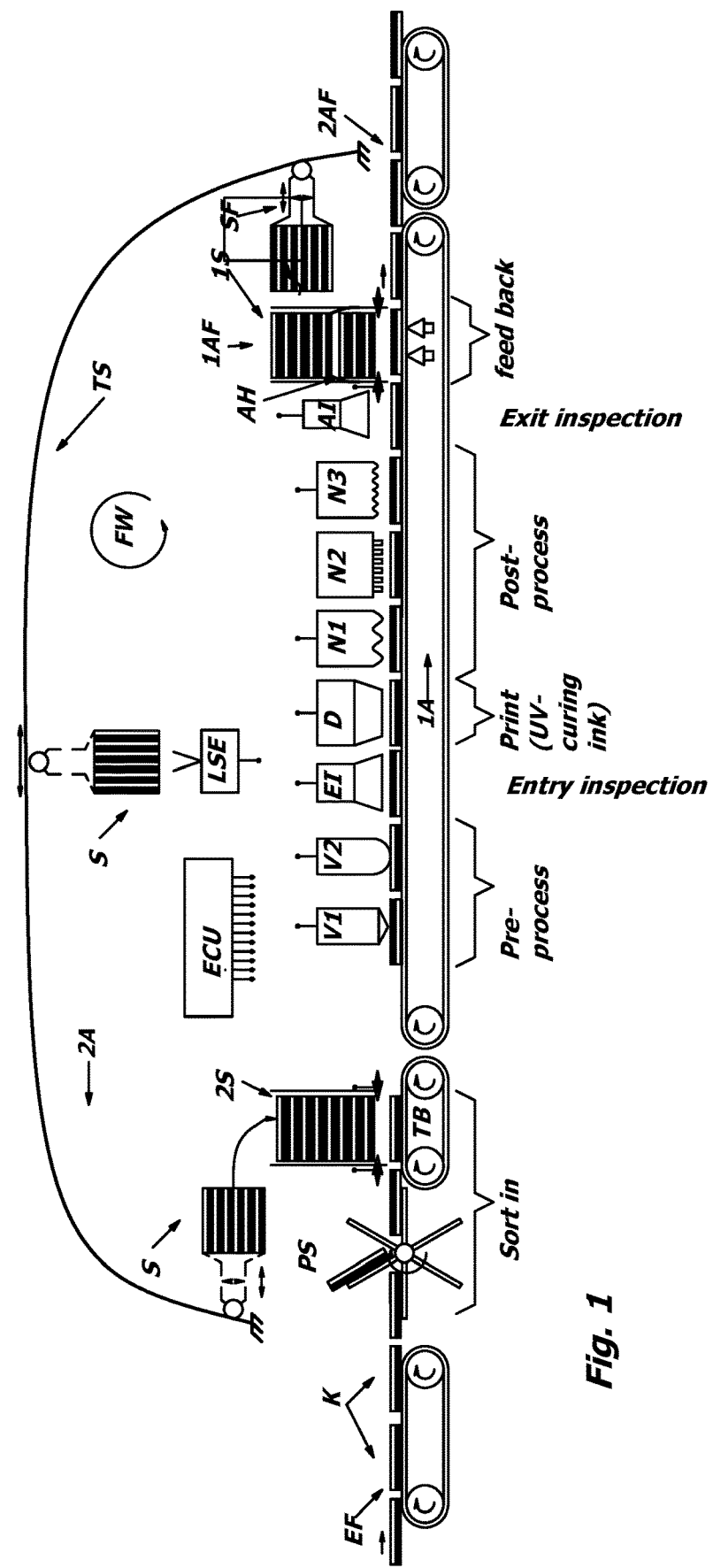
FIG. 1 schematically illustrates a variant of a device for printing on one or both sides of a plurality of flat objects.

FIG. 1 shows a device 10 for printing on one or both sides of flat objects K. In the variant shown, the objects K are realized as identification (ID) cards made of plastic. The device 10 has a loop-shaped conveying path FW for the flat objects K. The conveying path FW serves to convey the objects K on a first section 1A of the conveying path FW as individual objects K, and on a second section 2A of the conveying path FW as (partial) stacks of a plurality of objects K. The objects K are then conveyed along the conveying path FW.

In the variant illustrated here, the first section 1A of the conveyor path FW is a circulating or belt conveyor in which one or more endless conveyor belts 12 are guided over one or more driven and non-driven rollers. In the variant illustrated here, the second section 2A of the conveyor path FW comprises a rail conveyor carrying a gripper for a (partial) stack of the objects K, which gripper is movable along a transport rail TS in a controlled manner and is to be actuated in a controlled manner. In one variant, this gripper can also be rotated so that the orientation of the objects K in the (partial) stack is rotated by 180°.

The conveyor path FW has an infeed conveyor EF for the items K on one inflow side (on the left in FIG. 1). The infeed conveyor EF is used to feed the items K to be printed individually upstream to a printer D in the first section 1A of the conveyor path FW. The printer D is arranged along the first section 1A and is used to print on the objects K fed individually to the printer D. A first discharge conveyor 1AF is arranged downstream of the printer D and serves to individually discharge the items K to be printed on both sides from the first section 1A of the conveying path FW toward the second section 2A of the conveying path FW. In a variant not illustrated, the first discharge conveyor 1AF comprises one or more synchronously driven conveying sections arranged one behind the other in the conveying direction of the objects K. The conveying sections are arranged one after the other.

The first discharge conveyor 1AF cooperates with a first collector 1S to bring the objects K on their way as (partial) stacks S in the direction of the second section 2A of the conveying path FW. In this regard, in one variant, the first collector 1S is configured as a chute corresponding to the dimensions of the objects K, into which the first discharge conveyor 1AF introduces the objects K one by one. The first collector 1S is arranged downstream of the first discharge conveyor 1AF at the second section 2A of the conveying path FW. It serves to collect in a stack S the objects K discharged individually by the first discharge conveyor 1AF from the first section 1A of the conveying path FW.

The first collector 1S is also arranged to discharge one (partial) stack S at a time for pick-up by the stack conveyor SF as soon as a height of the first stack or the (partial) stack to be defined is reached, such (partial) stack comprising at least two or more—for example 5, 10, 20, 40, 50 or 100, etc. objects K—of the flat objects K is high.

A stack conveyor SF cooperating with the first collector 1S serves to remove one (partial) stack S of the objects K at a time from the first collector 1S and to send it on its way along the second section 2A of the conveying path FW. The stack conveyor SF conveys the (partial) stack S of objects K along the second section 2A of the conveying path FW to a second collector 2S for the objects K. In FIG. 1, the stack conveyor SF is illustrated in dashed lines at a middle and a right position along the conveying rail TS.

The second collector 2S is also arranged at the second section 2A of the conveying path FW. The second collector 2S serves to receive a (partial) stack S removed by the stack conveyor SF from the first collector 1S along the second section 2A of the conveying path FW and conveyed to the second collector 2S.

The stack conveyor SF also serves to turn the (partial) stack S between the first and second collectors 1S, 2S during the transport of the (partial) stack S along the second section 2A in such a way that in each case the unprinted side of the item K conveyed to the printer D faces the printer for printing after leaving the second collector 2S. In the variant shown in FIG. 1, this is achieved by the stack conveyor SF as a gripper traveling a path in the shape of an inverted U from the first to the second collector 1S, 2S with the (partial) stack S located between its arms. Obviously, the orientation of the objects K is rotated by 180° in the process, without any active rotation of the gripper being required.

If an object K to be printed on both sides has been printed twice, or if an object K to be printed on one side has been printed once and printing again or on the reverse side is not required, it is discharged from the conveying path FW by means of a second discharge conveyor 2AF. In the variant shown, the second discharge conveyor 2AF is designed as a belt conveyor that discharges the objects K downstream of the printer D individually from the loop-shaped conveyor path FW. The first section 1A of the conveying path FW serves to continuously transport the objects K at a number of pieces per unit of time (for example 4000 uph) which is at least twice as large as a number of pieces per unit of time at which the entry conveyor EF—continuously or cyclically conveys the objects K (for example 2000 uph). A buffer store PS may be provided between the entry conveyor EF and the first section 1A of the conveying path FW, which serves to temporally delay/synchronize an entry of objects and to enter objects K entered by the entry conveyor EF into the first section 1A of the conveying path FW as a contiguous group of a plurality of objects K.

Furthermore, the second collector 2S serves to make the objects K conveyed as (partial) stacks S along the second section 2A available for individual entry into the first section 1A of the conveying path FW on the upstream side to the printer D. The second collector 2S is used for the individual objects K to be fed into the first section 1A of the conveying path FW on the downstream side to the (optional) buffer store PS. The second collector 2S brings the separated items K to the (optional) buffer store PS on the downstream side, onto a cyclically conveying conveyor belt TB of the conveying path FW, which feeds the items K onto the conveyor belt of the first section 1A of the conveying path FW, which runs continuously at approximately twice the upm—units per hour.

Here, successive groups of a plurality of objects K may be spaced apart from each other in the manner K-K-L-L-K-L-L . . . or K-K-L-L-L-K-K-L-L . . . , etc., where L stands for an empty space and K stands for a space to which an object K can be deposited in a controlled manner out of the second collector 2S on the downstream side from the buffer store PS. Alternatively, and as illustrated in FIG. 1, individually spaced apart objects K may be entered in the manner K-L-K-L-K-L-L . . . . Further, the buffer store PS may enter the objects K inverted into the first section 1A as illustrated in FIG. 1. Before or after the buffer store PS, in a variant not illustrated, another station for turning the objects K is arranged. Thus, even in variants of the one buffer store PS turning the fed objects, the original orientation can be maintained if necessary by turning the objects K twice.

Along the first section 1A of the conveying path FW, on the upstream side to the printer D, several stations are provided for preparing the objects K for printing. In the illustrated variant, these are a station for increasing the adhesion V1 of the ink by means of plasma or corona treatment, a station for cleaning V2 the surface of the objects K to be printed, for example by means of cleaning rollers. Before being introduced into the printer D, each of the objects K is subjected to an input inspection EI by means of an imaging camera. Along the first section 1A of the conveying path FW, on the downstream side to the printer D, a plurality of stations are provided for printing post-processing of the objects K. After the printing of the objects K by the printer D, the objects K are fed downstream of the printer D successively to a station for pre-drying N1 (pinning) of the ink by means of (UV) light irradiation, to a station for applying N2 a covering varnish at least to a section of the objects, which can overlap with the printed image printed by the printer D, a station for curing N3 the cover coating and, if necessary, the ink by means of (UV) light irradiation, and a station for output inspection AI and checking of the printed data/contents by means of an imaging camera.

In the variant shown, the printer D is a single-pass inkjet printer having a plurality of ultraviolet (UV) curable ink print heads arranged in series in the direction of conveyance of the objects K to be printed, and including one or more reservoirs of an ultraviolet (UV) curable ink of different colors. Each printhead, associated with an ink reservoir, has a plurality of print nozzles to print a particular color (cyan, magenta, white, black, etc.). Each print head extends across the entire width of the flat objects transverse to the direction of conveyance.

Along the conveying path FW, in FIG. 1 on the second section 2A, a read/write device LSE is arranged. It is used to write information into an IC embedded on the object K. In the illustrated variant, the read/write device LSE is arranged to perform the writing of information as a collective entry while the stack is conveyed past the read/write device LSE. In other variants such a read/write device LSE is missing.

Along the conveying path FW, in a variant not further illustrated, a device for laminating, punching and/or embossing the objects K is provided on the upstream or downstream side of the printer D.

It should be understood that, depending on the required equipment of the device, not all or other stations may be provided upstream and downstream to the printer D.

In a single-sided printing process, objects K in the form of cards are continuously fed to the device with upm2000. The buffer store PS receives the items K and transfers them to the independently driven input conveyor EF. At a speed adapted to the printing process, for example, two objects K are placed close behind each other with 4000 upm on the continuously running input conveyor EF. The above-mentioned pattern with gaps between the objects K is created. FIG. 1 illustrates how the objects K are discharged from the buffer store PS individually with a gap, whereby a turned object K from the second collector 2S is inserted into each gap in a controlled manner, as explained further below.

The next steps are cleaning and incoming inspection of the objects K, followed by printing of the objects K with UV ink by the printer D (here a single-pass printer). After the printing of the objects K by the printer D, the objects K are fed—downstream of the printer D successively to a station for pre-drying N1 (pinning) of the ink by means of (UV) light irradiation, to a station for application N2 of a covering varnish, to a station for curing N3 of the covering varnish and, if necessary, of the ink by means of (UV) light irradiation, and to a station for output inspection AI and checking of the printed data/contents by means of an imaging camera. The masking varnish is applied to at least a section of the objects that can overlap with the printed image.

Cards detected as NOK (bad) by the output inspection AI are ejected into a separate bad tray at the end of the device, not illustrated further.

For double-sided or multi-sided printing, the item K is stacked in the first collector 1S after printing and inspecting one side. Once a stack height dependent on the job size has been reached, it is picked up by the stack conveyor SF. The stacking conveyor SF conveys the (partial) stack S of cards along the second section 2A of the conveying path FW to the second collector 2S. During the transport, the items K are turned as a (partial) stack S and are entered into the second collector 2S at the end. From this second collector 2S, the turned cards K are conveyed one by one upstream to the printer D on the first section 1A of the conveyor path FW. Subsequently, the above steps are carried out for single-sided printing on the other side of each of the items K. If, instead of the items K having two pages to be printed, a document with more than two pages, for example a passport book, is to be printed, a page-turning station can also be arranged in the first section 1A of the conveying path FW upstream of the printer D. The page-turning station is located in the first section 1A of the conveying path FW.

The first collector 1S and, in some variants, also the second collector 2S have spacers AH that may be adjustable in their spacing in order to form partial stacks of predefined height/number of items that are spaced apart from one another in the height direction. Thus, a collection of objects K discharged by the first discharge conveyor in the first collector 1S and a delivery of a (partial) stack S to the stack conveyor SF can overlap in time. Analogously, this applies to the delivery of individual items of the (partial) stack S and a pick-up of the (partial) stack S conveyed up by the stack conveyor SF by the second collector 2S.

FIGS. 2a-2d illustrate a variant of the first discharge conveyor 1AF' that cooperates with a variant of the first collector 1S' to move the objects K in the direction of the second section 2A of the conveying path FW as a (partial) stack S on the path. Thereby, in this variant, the first collector 1S' is designed as a lifting lift corresponding to the dimensions of the objects K. In one variant, this lifting lift is arranged laterally next to the conveyor belt of the first section 1A of the conveyor path FW at the point where the first collector 1S is arranged in FIG. 1 in order to bring the objects K onto the second section 2A of the conveyor path FW. This lifting lift is used to collect the objects K discharged individually from the first section 1A of the conveying path FW by the first discharge conveyor 1AF' in a stack S spaced apart from each other so that the objects K do not touch each other. After the objects K have been printed on one side, this is intended to prevent a printed image on one of the objects K which has not yet fully cured from rubbing off onto a surface of an adjacent object K. To bring this about, the objects K are pushed out individually transversely to the conveying direction of the conveying path FW by means of a pusher not illustrated in detail and are inserted between two toothed belts ZR1, ZR2 in a lowermost position of the lift. Subsequently, the two toothed belts ZR1, ZR2 of the lifting lift are moved by one tooth pitch by means of their driven rollers AR1 and AR2. Thus, the lowest position of the lifting lift is again free to receive the following object K from the first section 1A of the conveyor path FW. As soon as the intended number of objects K is picked up in the lifting lift of the first collector 1S', this number of objects K is delivered in the lifting lift to the variant of the stack conveyor SF' shown in FIGS. 2b, 2c, 2d, without the objects K touching each other during the transfer. This prevents the adjacent items K from inking each other or blurring their printed image, or the printed side of an item K from staining the unprinted side of an adjacent item K with ink.

The first collector 1S' is also set up to discharge one (partial) stack S at a time for pick-up by the stack conveyor SF' as soon as a height of the first stack or the (partial) stack to be defined is reached, such a (partial) stack being at least two or more—for example 5, 10, 20, 40, 50 or 100, etc. objects K—of the flat objects K is high.

The stack conveyor SF' cooperating with the first collector 1S' is used to pick up one (partial) stack S of each of the items K pushed out of the first collector 1S' and to send them on their way along the second section 2A of the conveying path FW.

In the variant shown in FIGS. 2a-2d, this is achieved by designing the stack conveyor SF' as a container in whose side walls recesses are provided corresponding to the tooth pitch of the two toothed belts ZR1, ZR2 of the first collector 1S'. The objects K are pushed out of the first collector 1S' as a stack by means of a pusher P located in the first collector 1S' and into the recesses of the stack conveyor SF'.

The stack conveyor SF' then conveys (see FIG. 1) at the transport rail TS the (partial) stack S of items K along the second section 2A of the conveying path FW to a second collector 2S' for the items K.

The second collector 2S' is also arranged on the second section 2A of the conveying path FW. The second collector 2S' serves to receive a (partial) stack S removed by the stack conveyor SF' from the first collector 1S' along the second section 2A of the conveying path FW and conveyed to the second collector 2S'.

The stack conveyor SF' also serves to turn the (partial) stack S between the first and second collectors 1S', 2S' during the transport of the (partial) stack S along the second section 2A in such a way (from the orientation according to FIG. 2b to the orientation according to FIG. 2c) that in each case the unprinted side of the item K conveyed to the printer D faces the printer D for printing after leaving the second collector 2S'.

In this case, the orientation of the objects K is rotated by 180° (from the orientation according to FIG. 2b to the orientation according to FIG. 2c) without the need for active rotation of the stack conveyor SF'.

A second collector 2S', similar to the first collector 1S' of FIG. 2a (except for the slide P), is also arranged along the second section 2A of the conveying path FW. The second collector 2S' serves to receive a (partial) stack S removed by the stack conveyor SF' from the first collector 1S' along the second section 2A of the conveying path FW and conveyed to the second collector 2S'.

The second collector 2S' also serves to make the items K conveyed as (partial) stacks S along the second section 2A available for individual entry into the first section 1A of the conveying path FW on the upstream side to the printer D. The second collector 2S' also serves to make the items K available for individual entry into the first section 1A of the conveying path FW on the downstream side to the (optional) buffer store PS. The second collector 2S' brings the separated objects K to the (optional) buffer store PS on the downstream side, onto a cyclically conveying conveyor belt TB of the conveyor path FW, which conveys the objects K onto the conveyor belt of the first section 1A, which runs continuously at approximately twice the upm (units per hour). of the first section 1A of the conveyor FW. The objects K can be from the second collector 2S' and the objects K from the buffer store PS, as described in connection with FIG. 1, can be discharged onto the conveyor TB in a defined sequence.conveyor TB in a defined sequence.

For this purpose, the second collector 2S' and the stacking conveyor SF' are positioned in such a way that the objects K are pushed out as a complete stack by means of a pusher arranged in the stacking conveyor SF' and pushed in between two toothed belts ZR1, ZR2 of the lowering lift of the second collector 2S'. To discharge the separated items K, the two toothed belts ZR1, ZR2 are then moved downward by one tooth pitch by means of their driven rollers AR1 and AR2. Thus, from the lowest position of the lowering lift of the second collector 2S', an object K is delivered onto the first section 1A of the conveyor path FW. Overall, this effectively prevents the printed objects from touching each other during handling. This prevents the adjacent objects K from inking each other or blurring their printed image, or the printed side of an object K from staining the unprinted side of an adjacent object K with ink.

A read/write device LSE is arranged along the conveying path FW and is used to write information into an IC embedded on the object K. In the illustrated variant, the read/write device LSE is set up to write the information as a collective entry while the stack is conveyed past the read/write device LSE. In other variants such a read/write device LSE is missing. Upstream of the second collector 2S', for example associated with the entry conveyor EF, the read/write device LSE can be mounted. In one variant, the read/write device LSE comprises a receptacle, for example in the form of a turntable rotating (vertically) about an axis of rotation, with receptacle locations arranged in the circumferential direction of the turntable for receiving a plurality of objects K during the writing-in of the information. In other variants, the read/write device LSE is associated with or downstream of the second discharge conveyor 2AF, which discharges the objects K individually from the loop-shaped conveyor path FW on the downstream side to the printer D. By means of an electronic control ECU, the individual stations and functions of the device are coordinated and controlled.

The variants of the device described above, as well as its construction and operating aspects, are merely intended to provide a better understanding of the structure, operation and features; they do not limit the disclosure to the variants, for example. The Figs. are partially schematic, with significant features and effects shown, in some cases significantly enlarged, to illustrate the functions, operating principles, technical variants and features. In this regard, each mode of operation, principle, technical variant and feature disclosed in the Figs. or in the text can be freely and arbitrarily combined with all claims, each feature in the text and in the other Figs., other modes of operation, principles, technical variants and features contained in or resulting from the present disclosure, so that all conceivable combinations can be assigned to the described approach. Combinations between all individual variants in the text, that is, in each section of the description, in the claims, and also combinations between different variants in the text, in the claims, and in the Figs. are included. Also, the claims do not limit the disclosure and thus the possible combinations of all disclosed features with each other. All disclosed features are also explicitly disclosed herein individually and in combination with all other features.

What is claimed is:

1. An apparatus for printing on one or both sides of flat objects, said apparatus comprising:
   a loop-shaped conveying path for the flat objects, said conveying path being configured to convey the objects individually along a first section of the conveying path, and to convey a stack of the objects along a second section of the conveying path;
   an infeed conveyor for the objects, said infeed conveyor being configured to individually feed the objects to be printed upstream to a printer in the first section of the conveying path;
   a printer arranged along the first section of the conveying path and being configured to print the objects fed individually to the printer by the first section of the conveying path;
   a first discharge conveyor for the objects, said first discharge conveyor being configured and controlled to discharge the objects to be printed on both sides downstream to the printer from the first section of the conveying path toward the second section thereof one by one;

a first collector for said objects, said first collector being arranged downstream to said first discharge conveyor at said second section of said conveying path and being configured to collect objects discharged from said first discharge conveyor in a stack;

a stack conveyor for conveying the stack of the objects from the first collector along the second section of the conveying path; and a second collector for the objects, said second collector being arranged at the second section of the conveying path and being configured to receive part or all of the stack conveyed by the stack conveyor along the second section of the conveying path and to introduce the objects individually upstream of the printer into the first section of the conveying path, wherein the first collector is configured to deliver part or all of the stack to the stack conveyor until a predetermined height of the stack is reached, and wherein the number of objects received by the stack conveyor in the stack is at least two of the flat objects.

2. The apparatus according to claim 1, wherein the stack conveyor is configured to turn the stack or part of the stack of objects between the first and the second collector in such a way that in each case the unprinted side of the object conveyed to the printer faces the printer for printing after leaving the second collector.

3. The apparatus according to claim 1, wherein a second discharge conveyor for the objects is provided and is configured to discharge the objects individually from the loop-shaped conveying path on the downstream side to the printer, or a magazine adjacent to the first collector is provided and is arranged to receive finished printed objects on the downstream side to the printer.

4. The apparatus according to claim 1, wherein the first section of the conveying path is configured to continuously convey the objects at a number of pieces per unit time that is at least twice as great as a number of pieces per unit time at which an entry conveyor continuously or intermittently conveys the objects, and/or wherein a buffer store is arranged between the entry conveyor and the first section of the conveying path and is set up to enter objects entered by the entry conveyor into the first section of the conveying path as a coherent group of a plurality of objects into the first section, and wherein successive groups are spaced apart from one another, or as objects individually spaced apart from one another, and/or are to be entered inverted into the first section.

5. The apparatus according to claim 1, wherein the first section of the conveyor path is configured to feed the objects upstream to the printer, to a cleaning and/or to an input inspection, and/or downstream to the printer, to a drying and/or an output inspection, and/or wherein the stack conveyor includes a gripper that is set up and arranged to grip and remove the stack or part of the stack of objects in the first collector and to deposit and release it in the second collector, and/or wherein a circulating or belt conveyor is configured to receive objects from the second collector and to transfer them to a downstream transport section, and/or wherein the printer is a single-pass inkjet printer including a plurality of print heads for ultraviolet curable ink arranged in series in the conveying direction of the objects to be printed and includes one or more reservoirs with an ultraviolet curable ink of different color, and/or wherein along the conveying path on the downstream side to the printer there is provided a station for predrying the ink by ultraviolet light irradiation, a station for applying a covering varnish and/or a station for curing the covering varnish by ultraviolet light irradiation.

6. The apparatus according to claim 1, wherein the first collector is configured as a lift corresponding to the dimensions of the objects, which is arranged to collect objects discharged individually from the first section of the conveying path in a stack spaced apart from one another, and wherein a pusher is configured to push out said objects one by one transversely to the conveying direction of said conveying path and to push them in between two toothed belts of said lifting lift, and wherein respective driven rollers are arranged and adapted to move said toothed belts.

7. The apparatus according to claim 1, wherein the first collector includes a plunger that is configured to deliver an intended number of the objects in a lift of the first collector to the stack conveyor, and/or wherein the stacking conveyor is configured as a container, in the side walls of which recesses are provided for receiving the objects that are spaced apart from one another and which a pusher located in the first collector pushes into the container.

8. The apparatus according to claim 1, wherein the second collector and the stack conveyor are configured relative to one another so that the objects are pushed out as a complete stack by a pusher arranged in the stack conveyor and are pushed in between two toothed belts of the second collector, and/or wherein the second collector is configured to move the two toothed belts by a tooth pitch by driven rollers in order to discharge an object from a lowermost position of the two toothed belts of the second collector onto the first section of the conveyor path for discharging the objects.

9. A method for printing on one or both sides of flat objects, said method comprising:

conveying the objects on a first section of a loop-shaped conveying path and on a second section of the conveying path as a stack of the objects;

conveying the objects to be printed by an entry conveyor into the first section of the conveying path on the upstream side towards a printer;

printing the objects conveyed by the printer arranged along the first section of the conveying path on a side facing the printer;

discharging the objects to be printed on both sides by a first discharge conveyor, downstream of the printer, from the first section of the conveying path in the direction of the second section;

collecting objects in a stack discharged from the first discharge conveyor by a first collector arranged downstream of the first discharge conveyor at the second section of the conveying path;

conveying the stack of the objects from the first collector along the second section of the conveying path by a stack conveyor; and picking up at least part of the stack conveyed by the stack conveyor along the second section of the conveying path by a second collector arranged at the second section of the conveying path and feeding the objects upstream to the printer into the first section of the conveying path, wherein when a predetermined height of the stack is reached, the stack or part of the stack is removed from the first collector by the stack conveyor and conveyed along the second section of the conveyor path to the second collector and deposited therein, wherein the stack or part of the stack is at least two objects high, and wherein the stack or part of the stack is provided at an end of the second section of the loop-shaped conveyor path where turning of the stack or part of the stack occurs, and the objects are fed into the first section, then fed to the printer, and then discharged from the loop-shaped conveyor path at the end of the first section.

10. The method according to claim 9, wherein the second collector discharges the objects and turns the objects, so that an unprinted side of the object fed to the printer faces the printer for printing.

11. The method according to claim 9, wherein the first section of the conveying path continuously conveys the objects at a number of pieces per unit time that is at least twice a number of pieces per unit time at which an entry conveyor continuously or intermittently conveys the objects, and a buffer store between the entry conveyor and the first section of the conveying path enters objects entered into the first section of the conveying path by the entry conveyor as a coherent group of a plurality of objects, successive groups being spaced apart from one another, or the buffer store enters the objects into the first section as individually spaced-apart objects, and/or inverted.

12. The method according to claim 9, wherein the first section of the conveying path feeds the objects upstream to the printer for cleaning and/or input inspection, and/or feeds the objects downstream to the printer for drying and/or output inspection.

13. The method according to claim 9, wherein a gripper of the stacking conveyor grips and removes the stack of objects in the first collector, and deposits and releases the objects in the second collector, and/or wherein along the conveying path, a read/write device writes information into a magnetic stripe arranged on the object, into an integrated circuit embedded in the object, and wherein the read/write device performs the writing of the information for each object individually or as a collective entry.

* * * * *